(12) United States Patent
Wilton et al.

(10) Patent No.: US 11,775,363 B1
(45) Date of Patent: Oct. 3, 2023

(54) SYSTEM AND METHOD FOR AUDITING A GRAPH-BASED API

(71) Applicant: Synopsys, Inc., Mountain View, CA (US)

(72) Inventors: Shane Edward Wilton, East Palo Alto, CA (US); Kavin Subramanyam, Sunnyvale, CA (US); Nathaniel Robert Heydt, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 147 days.

(21) Appl. No.: 16/986,141

(22) Filed: Aug. 5, 2020

(51) Int. Cl.
*G06F 9/54* (2006.01)
*G06F 16/901* (2019.01)
*H04L 67/133* (2022.01)

(52) U.S. Cl.
CPC .......... *G06F 9/547* (2013.01); *G06F 16/9024* (2019.01); *H04L 67/133* (2022.05)

(58) Field of Classification Search
CPC ....... G06F 9/547; G06F 16/9024; H04L 67/40
See application file for complete search history.

(56) References Cited

U.S. PATENT DOCUMENTS

| | | | |
|---|---|---|---|
| 6,556,983 B1* | 4/2003 | Altschuler | G06K 9/6296 707/E17.011 |
| 9,317,557 B2* | 4/2016 | Shao | G06F 16/2456 |
| 2011/0119245 A1* | 5/2011 | Sargeant | G06F 16/9024 707/706 |
| 2015/0026158 A1* | 1/2015 | Jin | G06F 16/90335 707/769 |
| 2016/0321357 A1* | 11/2016 | Novacek | G06F 16/35 |
| 2020/0265049 A1* | 8/2020 | da Trindade | G06F 16/24535 |
| 2021/0263898 A1* | 8/2021 | Lei | G06F 16/2453 |

* cited by examiner

*Primary Examiner* — Kevin L Young
*Assistant Examiner* — Carina Yun
(74) *Attorney, Agent, or Firm* — Fenwick & West LLP

(57) ABSTRACT

A method for auditing a graph-based API includes obtaining a structure describing object types of the API and fields of the object types. A schema graph of the structure is generated including nodes representing object types. The nodes are connected by directed edges representing field resolution between object types. A line graph is generated and includes a node in place of each edge of the schema graph and edges in place of nodes of the schema graph. Frontiers of the line graph are determined, a frontier being subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument.

18 Claims, 10 Drawing Sheets

API Structure 300

```
type A {
    ref_C (id: integer): C
    id: integer
} type B {
    ref_C (id: integer): C
    id: integer
} type C {
    id: integer
} type Query {
    get_A (id: integer): A
    get_B (id: integer): B
}
```

FIG. 3B

SYSTEM AND METHOD FOR AUDITING A GRAPH-BASED API

FIELD

This disclosure relates generally to an application programming interface (API) security auditing system, and more particularly, to a system and method for auditing graph-based APIs.

BACKGROUND

Security scans and audits are used to detect vulnerabilities in application programming interfaces (APIs) and in API architectures. Security scans have an inherent tradeoff between scan coverage, the time it takes to perform the scan, and the reliability of the results of the scan. That is, a security scan that tests every possible call of an API may require too many calls to be useful in that it may take a relatively long time for all of the calls to be tested. Conversely, a security scan that tests only a random sample of the API calls may finish quickly without reliably testing all possible security vulnerabilities of the API.

SUMMARY

According to various embodiments, a method for auditing a graph-based API is described. The method includes obtaining a structure of an API describing object types defined by the API and fields associated with the object types where each field has a field name and a field resolution type. The method further includes generating a schema graph based on the structure. The schema graph includes a plurality of schema graph nodes, each node being labeled with an object type defined by the API. For each field associated with an object type, the schema graph includes a directed edge that originates at a first schema graph node that represents the object type and leads to a second schema graph node that represents an object type identified by the field resolution type of the field. The method further includes generating a line graph based on the schema graph, the line graph including a line graph node labeled with a field name in place of each directed edge of the schema graph and the line graph including directed edges in place of a plurality of the schema graph nodes of the schema graph. Based on the generated line graph, the method further includes determining a set of frontiers of the line graph, wherein a frontier includes a subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument. The method further includes determining an order in which to audit one or more frontiers in the set of frontiers, generating a representative set of queries for auditing the API, the representative set of queries including a query for testing one or more of the frontiers, and auditing the API by providing one or more test inputs to queries in the representative set of queries in the determined order.

According to various embodiments, a non-transitory computer-readable storage medium including instructions that, when executed by a processor, cause the processor to execute steps for auditing a graph-based API is described. The steps include obtaining a structure of an API describing object types defined by the API and fields associated with the object types where each field has a field name and a field resolution type. The steps further include generating a schema graph based on the structure. The schema graph includes a plurality of schema graph nodes, each node being labeled with an object type defined by the API. For each field associated with an object type, the schema graph includes a directed edge that originates at a first schema graph node that represents the object type and leads to a second schema graph node that represents an object type identified by the field resolution type of the field. The steps further include generating a line graph based on the schema graph, the line graph including a line graph node labeled with a field name in place of each directed edge of the schema graph and the line graph including directed edges in place of a plurality of the schema graph nodes of the schema graph. Based on the generated line graph, the steps further include determining a set of frontiers of the line graph, wherein a frontier includes a subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument. The steps further include determining an order in which to audit one or more frontiers in the set of frontiers, generating a representative set of queries for auditing the API, the representative set of queries including a query for testing one or more of the frontiers, and auditing the API by providing one or more test inputs to queries in the representative set of queries in the determined order.

According to various embodiments, a system for auditing a graph-based API is described. The system includes a processor and a non-transitory computer-readable storage medium including instructions that, when executed by the processor, cause the processor to perform steps for auditing a graph-based API. The steps include obtaining a structure of an API describing object types defined by the API and fields associated with the object types where each field has a field name and a field resolution type. The steps further include generating a schema graph based on the structure. The schema graph includes a plurality of schema graph nodes, each node being labeled with an object type defined by the API. For each field associated with an object type, the schema graph includes a directed edge that originates at a first schema graph node that represents the object type and leads to a second schema graph node that represents an object type identified by the field resolution type of the field. The steps further include generating a line graph based on the schema graph, the line graph including a line graph node labeled with a field name in place of each directed edge of the schema graph and the line graph including directed edges in place of a plurality of the schema graph nodes of the schema graph. Based on the generated line graph, the steps further include determining a set of frontiers of the line graph, wherein a frontier includes a subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument. The steps further include determining an order in which to audit one or more frontiers in the set of frontiers, generating a representative set of queries for auditing the API, the representative set of queries including a query for testing one or more of the frontiers, and auditing the API by providing one or more test inputs to queries in the representative set of queries in the determined order.

BRIEF DESCRIPTION OF THE DRAWINGS

FIG. 3B illustrates an API structure of an example API, in accordance with an embodiment.

Figure 1:
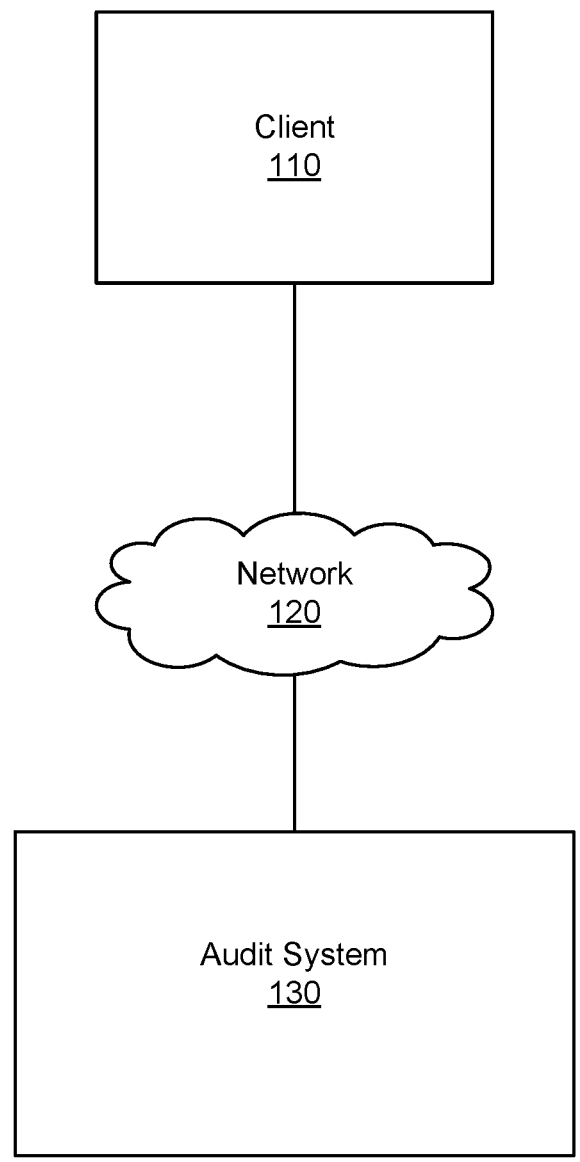
FIG. 1 is a high-level block diagram of a system environment for an audit system, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Some query languages or other programming languages that support application programming interfaces (APIs) provide an introspection service that exposes API schemas (i.e., introspection results or other API documentation) so that a developer or other user can easily obtain the structure and documentation for an API. Knowledge of API documentation can be helpful for performing security audits on the API because an API specification defines the structure of calls made to the API and also defines what parameters are available as valid inputs and outputs to API function calls. An auditing system can then more easily determine whether an API performs as expected by comparing expected input and output values with actual results of test API calls. An example query language that provides an introspection service is GRAPHQL, which provides an API for using structured nested objects to access data. For example, a query may include a request for information about an object and the object type may be defined as a set of fields including scalar values and including further API calls to other objects to resolve the field values. Such API services may have more uses beyond retrieving data from a database and among other services, may also be used as query languages for aggregating data across multiple remote services or APIs.

To audit an API, the audit system obtains an introspection result for the API. The introspection result may include documentation that specifies the structure of the API. In some cases, the audit system may decode the introspection result to convert the information into an API schema format that can be used for analyzing the API. Based on the received API schema, the audit system generates a schema graph that represents a data structure of object types and fields included in the API. The schema graph includes nodes representing object types and directed edges associated with fields of the API connecting the nodes. For example, if an object is defined in an API using a field that resolves to another object type of the API, the schema graph for the API would include a directed edge representing this relationship between the two object types.

The schema graph thus can provide a traversable representation of the entire API. That is, by visiting every node in the schema graph, the audit system can access all of the object types that are defined by the API. However, to test for security vulnerabilities in an API, the audit system should access all the fields of the API, since fields that accept argument parameters as input from outside users and systems are the aspects of the API that may be exploitable, e.g., by code injection. To prepare for auditing the API fields, the audit system generates a line graph based on the schema graph.

In one embodiment, the line graph is created by generating a graph with a node for each of the edges of the schema graph and an edge for each of the nodes of the schema graph, not including any root node (e.g., "Query" and "Mutation" nodes) and not including any scalar leaf nodes (e.g., "integer", "string", and "Boolean" nodes). The root type nodes are special cases of nodes that remain in the line graph and connect via edges to nodes of the line graph that represent fields that are accessible from the root of the API schema. The scalar type leaf nodes of the line graph are special cases of nodes from the schema graph that remain in the line graph and that do not have any outgoing edges. Other than the special case nodes, in the line graph, a directed edge points from a node representing a field of an object type that resolves to another object type, to a node representing a field of the object type to which the first field resolves. Nodes of the line graph representing fields that accept input arguments are also referred to herein as "frontier nodes." That is, a frontier node is a node representing a field of an object type of the API that takes in at least one input argument. A directed edge of the line graph leading into a frontier node may be labeled, annotated, or otherwise associated with information about the one or more accepted input arguments of the field. The directed edges of the line graph may be annotated with type data and/or with any information about the arguments that could be useful from a security scanning perspective. For example, annotating arguments with additional constraints (e.g., minimum length, maximum length, etc.) or annotating a directed edge with authorization requirements (e.g., "must be admin", must be logged in", etc.) can further refine payload generation and audit scheduling. By visiting every node (i.e., every vertex) in the line graph, the audit system can ensure that it has accessed every field of the API.

Since it is often inefficient and sometimes infeasible to test every field or to test all subsets of fields of the API as represented by the nodes in the generated line graph, the audit system uses the structure and data of the line graph to determine a representative set of queries for auditing the API. The representative set of queries may be a set of queries that can be used to audit the API without needing to audit every combination of fields of the API. To do so, the audit system computes "frontiers" of the line graph. A frontier is a subgraph of the line graph such that: (1) the subgraph is rooted at either a frontier node of the line graph or a root node of the line graph (e.g., the "Query" node), and (2) the subgraph is the maximal subgraph disjoint from other frontier nodes. Thus, a frontier can be conceptualized as a collection of nodes of the line graph that can be reached from a frontier node or a "Query" root node without traversing a directed edge labeled with a field argument. Frontiers may have overlapping nodes, but frontiers do not share frontier nodes.

To generate the representative set of queries for auditing the API, the audit system determines an efficient set of paths along the directed edges of the line graph connecting the frontiers through the set of frontiers. When generating a representative document for auditing a specific frontier, the system may generate a document for each possible path through the other frontiers (taking the shortest path through each frontier) to arrive at the specific frontier for auditing. The representative documents may be ranked in ascending order by the number of frontiers their paths pass through (i.e., the system starts by testing the representative document with the least frontiers along a possible path and, if that path does not work, the system may use the path of the next representative document in the ranked list to try to access the specific frontier). The first such document that successfully executes against the API may become the representative document for auditing that specific frontier. This approach results in a simplest representative document for auditing the specific frontier that takes a path that avoids as many other frontiers as possible, since it may not be feasible to resolve through the other frontiers consistently. In some embodiments, a path representing an order in which to audit the representative set of queries may be selected based on a weighting scheme that weights the frontiers based on information about the complexity or number of input arguments that are needed to resolve a field to access the frontier. The representative set of queries, which may have a recursive structure due to the nested nature of the graph representation of the API, is generated based on the input arguments along the determined path used for accessing all of the frontiers. The audit system may audit the API (or a specific frontier within the API) by testing the API calls defined by the representative queries.

The features and advantages described herein are not limiting and not all-inclusive. Many additional features and advantages will be apparent to one of ordinary skill in the art in view of the drawings, specification, and claims hereof.

FIG. 1 is a high-level block diagram of a system environment for an audit system, in accordance with an example embodiment. FIG. 1 includes a client 110, a network 120, and an audit system 130. For clarity, only one client 110 and one audit system 130 are shown in FIG. 1. Alternate embodiments of the system environment can have any number of clients 110 as well as multiple audit systems 130. The functions performed by the various entities of FIG. 1 may vary in different embodiments. The audit system 130 analyzes application programming interface (API) information and uses the analysis to perform audits of the API to identify and detect security vulnerabilities.

The client 110 may be a system hosting, providing access to, or providing information about an API. In some embodiments an organization, system, entity, or user may request an audit of an API from the audit system 130 through the client 110. In some embodiments, a security audit may be initialized at the audit system 130. In various embodiments, the client 110 may be a computing device that can host an API or a computing device that can provide information about an API, such as a server, a desktop computer, a smartphone, a tablet, or a notebook computer.

The client 110 can communicate with the audit system 130 via the network 120 which may include any combination of local area and wide area networks employing wired or wireless communication links. In some embodiments, all or some of the communication on the network 120 may be encrypted.

The audit system 130 analyzes API information to determine a representative set of queries to use to test the API in an audit. The representative set of queries may include a set of API calls that are representative of all possible API calls for performing an audit, although the set may not include a call to every object type or field of the API. The audit system 130 may further perform the API audit to test the API for security vulnerabilities. To determine the representative set of queries to the API, the audit system 130 obtains information about the API, for example from the client 110. Based on the obtained API information, the audit system generates a schema graph. The schema graph represents a data structure of object types and fields included in the API. The audit system 130 uses the structure of the schema graph to generate a line graph. The line graph is structured such that it can be used to determine a set of frontiers. A frontier is a subgraph of the line graph such that: (1) the subgraph is rooted at either a frontier node of the line graph or a root node of the line graph (e.g., the "Query" node), and (2) the subgraph is the maximal subgraph disjoint from other frontier nodes. The audit system 130 uses the determined frontiers to generate a set of representative queries related to the frontiers and may perform a security audit of the API by testing the set of representative queries.

Figure 2:
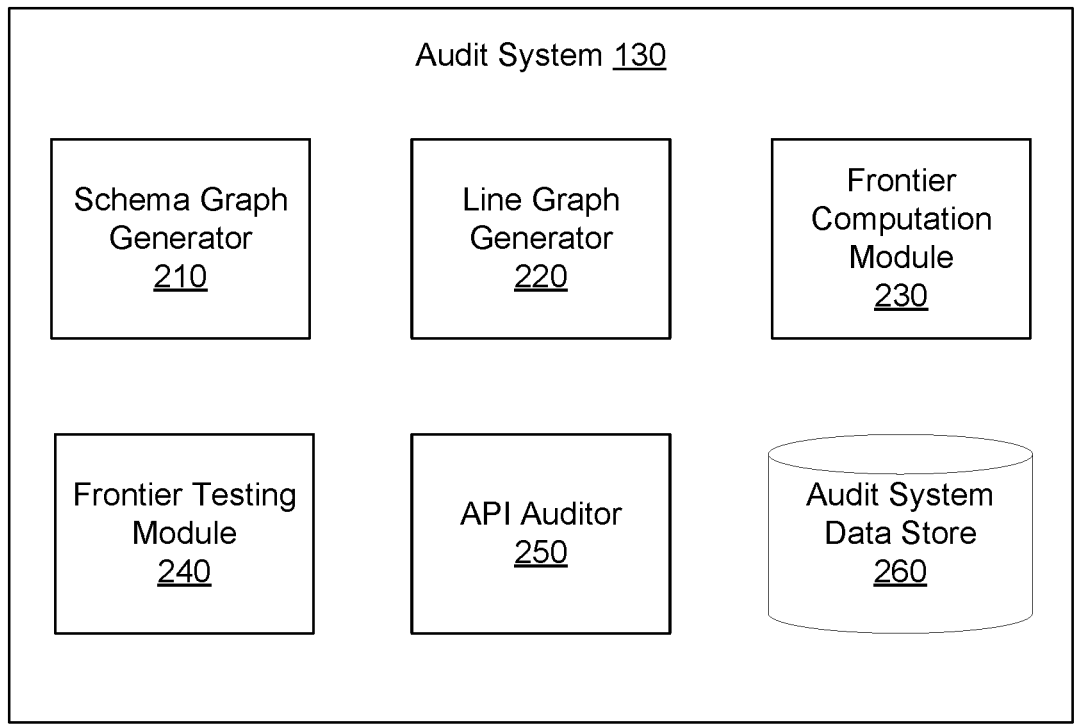
FIG. 2 is a high-level block diagram of a system architecture for an audit system, in accordance with an example embodiment.

FIG. 2 is a high-level block diagram of a system architecture for an audit system, in accordance with an example embodiment. The audit system 130 includes various modules and data stores to generate representative queries and perform API audits. The audit system 130 includes a schema graph generator 210, a line graph generator 220, a frontier computation module 230, a frontier testing module 240, an API auditor 250, and an audit system data store 260. Computer components such as web servers, network interfaces, security functions, load balancers, failover servers, management and network operations consoles, and the like are not shown so as not to obscure the details of the system architecture. Additionally, the audit system 130 may contain more, fewer, or different components than those shown in FIG. 2 and the functionality of the components as described herein may be distributed differently from the description herein.

The schema graph generator 210 constructs schema graphs based on information obtained by the audit system 130 about an API. In some embodiments, the schema graph generator 210 requests an introspection result describing an API schema, for example, from the client 110. An introspection result is information about the contents and properties of an API, as provided by a system hosting the API. The introspection result may include documentation that specifies the structure of the API. In various embodiments, the schema graph generator 210 may also receive API information by other means than an introspection result. If needed, the schema graph generator 210 may reformat any information received about the API (e.g., from an introspection result or from another source) into a usable API schema format prior to generating a schema graph. In various embodiments, API information may be stored in the audit system data store 260. Using the obtained API information, the schema graph generator 210 generates a schema graph that represents the API structure of the API. In one embodiment, a schema graph is a graph that includes a node for each object type described by the API and directed edges that connect the nodes representing resolution of fields of the objects as specified by the API. The schema graph generator 210 may store generated schema graphs in the audit system data store 260 for later access by other modules of the audit system 130. Additional information about schema graph generation is included in the description of FIG. 4.

The line graph generator 220 constructs line graphs based on schema graphs produced by the schema graph generator 210. In one embodiment, a line graph is a graph with a node for each of the edges of the schema graph and an edge for each of the nodes of the schema graph, not including any root node (e.g., "Query" and "Mutation" nodes) and not including any scalar leaf nodes (e.g., "integer", "string", and "Boolean" nodes). The root type nodes are special cases of nodes that remain in the line graph and connect via edges to nodes of the line graph that represent fields that are accessible from the root of the API schema. The scalar type leaf nodes of the line graph are special cases of nodes from the schema graph that remain in the line graph and that do not have any outgoing edges. The directed edges that connect the nodes of the line graph represent inputs into the fields represented by the nodes of the line graph. The line graph is structured such that it can be used to generate subsets of the nodes of the graph that accept similar input argument values. The line graph generator generates line graphs based on schema graphs. The line graph generator 220 may access a schema graph from the audit system data store 260 or receive the line graph data from the schema graph generator 210. To construct a line graph, the line graph generator 220 inverts the schema graph to include nodes that represent fields of the object types described by the API (where the nodes of the line graph were edges of the schema graph). The line graph generator may store generated line graphs in the audit system data store 260 for later access by other modules of the audit system 130. Additional information about line graph generation is included in the description of FIG. 5.

The frontier computation module 230 determines sets of frontiers associated with line graphs that are produced by the line graph generator 220. A line graph has "frontier nodes," that is, nodes of the line graph representing fields of the API that accept input arguments. Each frontier is a subgraph of the line graph such that: (1) the subgraph is rooted at either a frontier node of the line graph or at a root node of the line graph, and (2) the subgraph is the maximal subgraph disjoint from other frontier nodes. A frontier can be conceptualized as a collection of nodes of the line graph that can be reached from a frontier node or a root node of the line graph without traversing a directed edge labeled with a field argument. The frontier computation module 230 may access a line graph stored at the audit system data store 260, or may receive a line graph from the line graph generator 220. The frontier computation module 230 analyzes the line graph and determines a set of frontiers included in the line graph. In one embodiment, the frontier computation module generates a document graph. The generated frontiers are represented as nodes of the document graph and the directed edges of the line graph that connect the frontiers are the directed edges of the document graph. That is, the directed edges of the document graph are the directed edges of the line graph that are labeled, annotated, or otherwise associated with input arguments to frontier nodes for resolving fields of the API. The frontier computation module may store information about the determined frontiers in the audit system data store 260. Additional information about computing frontiers is included in the description of FIG. 6.

The frontier testing module 240 generates a set of representative queries for use in auditing the API. Since the frontiers represent subsets of the API with resolution logic that relies on the same subset of user input to respective frontier nodes, the frontiers can be used to perform more efficient audits of the API without having to individually test every API object type and every field associated with the object types. For example, in one embodiment, only one or more fields that accept input arguments into the frontier may need to be tested to audit all of the object types and fields that are associated with the frontier. The frontier testing module 240 may access frontier information associated with an API from the audit system data store 260 or may receive frontier data about an API from the frontier computation module 230. The frontier testing module 240 determines a set of paths through the document graph that accesses every frontier or that access a specific frontier that is selected for auditing. Since there may be multiple possible sets of paths that access every node of a document graph, the frontier testing module 240 may weigh the edges of the document graph and then compute the set of shortest paths that accesses all of the nodes, accounting for the weights along the paths. For example, the edges of the document graph which represent fields that accept input arguments, may be assigned weights based on the number of input arguments, the complexity of the input arguments, or the extent to which the arguments are deterministic.

In some embodiments, all input paths into a frontier node may need to be audited since they each represent a portion of the API that has distinct resolution logic. However, when frontiers are nested, rather than auditing all paths leading to a nested frontier, the audit system 130 may audit a shortest path through the parent frontiers and may only need to access the frontier via other paths if the representative documents generated using the shortest path fail to successfully execute against the API. The frontier testing module 240 uses the determined set of shortest paths through the document graph to generate a set of representative queries for testing the API. Since some API objects may be accessed only via resolution of fields of other API objects, the representative queries may be nested. The order for nesting and thus for executing the representative queries is determined based on the determined set of shortest paths.

In some embodiments, the audit system 130 may store the representative set of queries for future audits or may provide the representative set of queries to another system to perform audits of the API. In other embodiments, the API auditor 250 may perform an audit of the API by testing the representative queries. Using the information about expected values of input arguments (e.g., from an introspection result) the API auditor 250 provides one or more test input values to the representative queries and determines whether the API returns a valid and expected result value. The test input values may be dynamically generated. In some embodiments, the dynamically generated test input values may be merged with additional statically defined data. For example, if a user of the API scanner system has example values for certain arguments of certain fields, the example values may be merged into the representative queries for purposes of assisting the auditing system 130.

The audit system data store 260 stores data used by the audit system 130. As described above, in various embodiments the audit system data store 260 may store API schema data, schema graphs, line graphs, frontier data and document graphs, representative query sets for APIs, test values, and audit results. In some embodiments, the audit system data store 260 may be a database that can be accessed by some or all modules of the audit system 130.

Figure 3A:
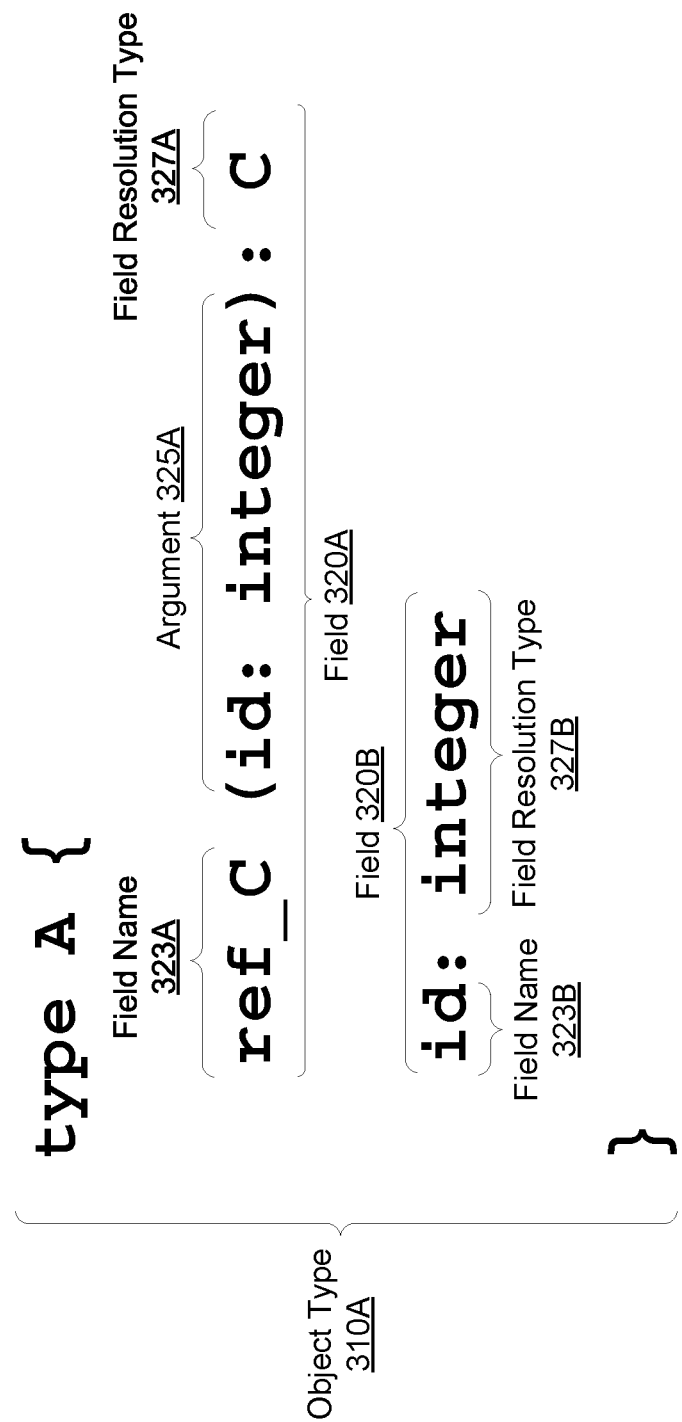
FIG. 3A illustrates a schema for an object type specified in an example API, in accordance with an embodiment.

FIG. 3A illustrates a schema for an object type specified in an example API, in accordance with an embodiment. In some embodiments, APIs (e.g., graph based APIs like GRAPHQL) specify one or more object types that describe the structure of object data that can be accessed in a database via calls to the API and may also be used as a query language for aggregating data across multiple remote services or APIs. To request information stored in a database, a user may query the database requesting values of fields of a specific object and in response the database returns the field values stored for the object.

In the example of FIG. 3A, an object type 310 has fields 320. FIG. 3A provides an example object type 310A of an object of type "A". In the example of FIG. 3A, an object type 310A of type "A" has two fields 320 (e.g., field 320A and field 320B). A field 320 includes a field name 323, a field resolution type 327, and may optionally include an argument 325. For example, object type A 310A has a field 320A with a field name 323A "ref_C" that accepts as an argument 325A "id" an object that is an integer type, and resolves to a field resolution type 327A "C". The object type A 310A also has a field 320B with a field name 323B "id" that resolves to a resolution type 327B "integer".

FIG. 3B illustrates an API structure of an example API, in accordance with an embodiment. The API structure 300 of the example in FIG. 3B specifies four types of objects. The specified objects include object type "A" 310A, object type "B" 310B, object type "C" 310C, and root type "Query" 315. The root type 315 may be a special type of object that provides access to the schema of other object types 310, and may be used, for example to present introspection results about the API.

As described with respect to FIG. 3A, object type 310A of type "A" has two fields 320A and 320B with respective field names 323 "ref_C" and "id". The "ref_C" field 320A accepts an argument 325A called "id" of type "integer" and resolves to an object type 310C "C". The "id" field 320B resolves to an integer. Similarly, the example API structure 300 of FIG. 3B has an object type 310B of type "B" with two fields 320C and 320D with respective field names 323 "ref_C" and "id". The "ref_C" field 320C accepts an argument 325B called "id" of type "integer" and resolves to an object type 310C "C". The "id" field 320D resolves to an integer. The example further specifies an object type 310C "C" having one field 320E with field name "id" that resolves to an integer. The root type 315 "Query" has two fields 320F and 320G, respectively named "get_A" and "get_B". The "get_A" field 320F accepts an argument 325C called "id" of type "integer" and resolves to an object type 310A "A". The "get_B" field 320G accepts an argument 325D called "id" of type "integer" and resolves to an object type 310B "B".

Certain objects in an API may be scalar objects. Scalar objects are objects that do not include fields resolving to other object types. Examples of scalar objects include, string, integer, float, and Boolean. For example, the "id" field 320B of object type 310A "A" resolves to "integer" which is a scalar type object.

Figure 4:
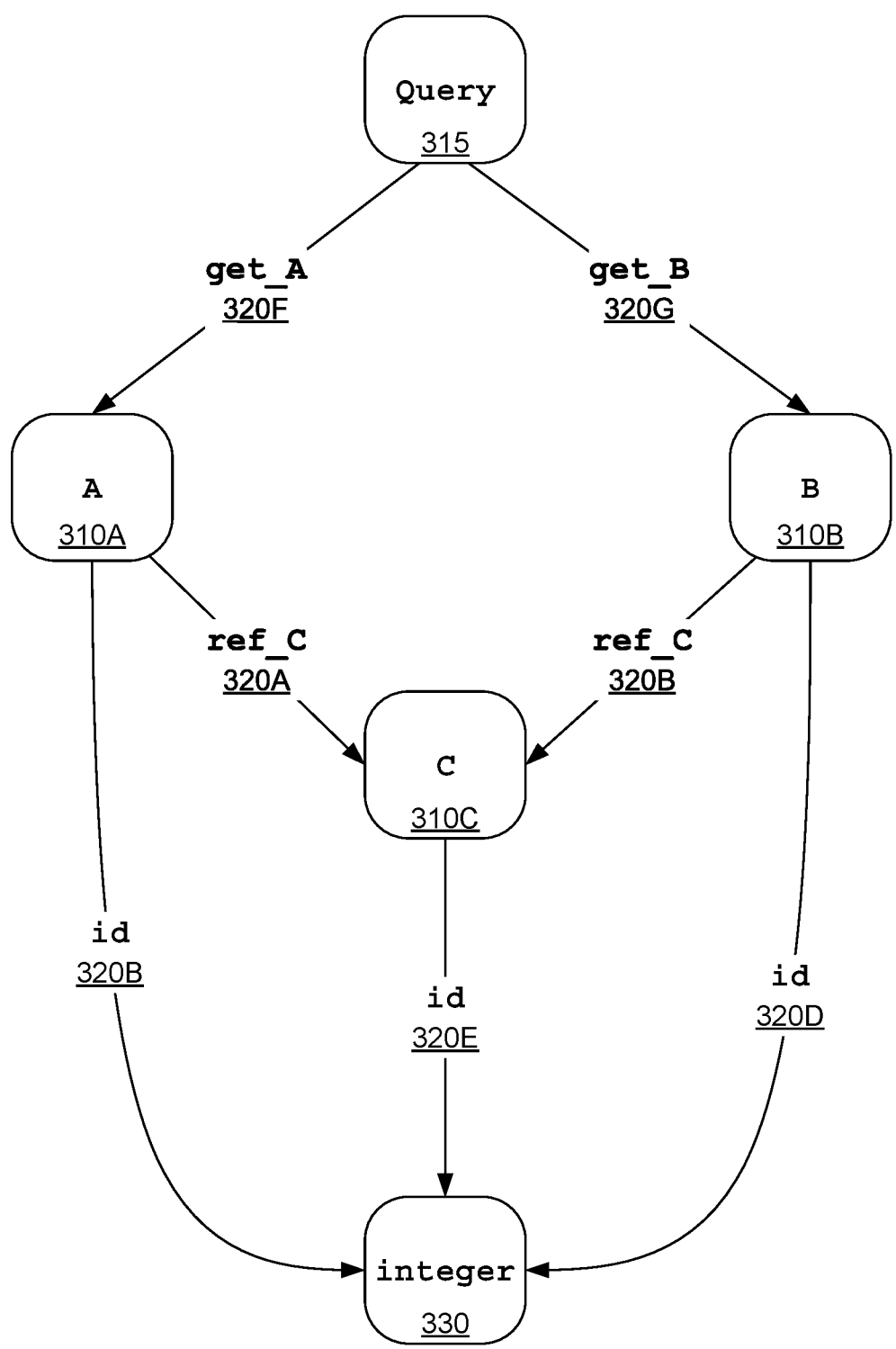
FIG. 4 illustrates an example schema graph for the API structure of FIG. 3B, in accordance with an embodiment.

FIG. 4 illustrates an example schema graph for the API structure of FIG. 3B, in accordance with an embodiment.

The schema graph generator 210 generates a schema graph, such as an schema graph 400 based on the API structure 300. The schema graph 400 includes nodes that are labeled with object types 310. The nodes represent the object types 310 specified in the API structure 300. The schema graph also includes a node representing a root type object 315. In one embodiment, a schema graph 400 begins at a single node representing a root type object 315, from which nodes representing other object types 310 may be accessed via edges of the schema graph 400. A schema graph may also include one or more nodes representing scalar type objects 330. In this way, the schema graph 400 provides a graphical representation of the API structure 300.

The example schema graph 400 of FIG. 4 includes nodes representing the root object 315 labeled "Query", three nodes representing object types 310A "A", 310B "B", and 310C "C", and a node representing the scalar type object 330 labeled "integer".

The nodes in a schema graph 400 are connected to other nodes with directed edges. A directed edge in the schema graph 400 represents a field 320 of an object type 310 of the API, as defined in the API structure 300. As described previously, fields 320 of object types 310 in the API structure 300 resolve to other object types 310 or to scalar object types. A directed edge in the schema graph 400 originates at a node representing an object type 310 for which it represents a field 320 and points to a node representing an object type 310 to which the field resolves. For example, in the API structure of FIG. 3B, object type 310A "A" has a field 320A labeled "ref_C" that resolves to an object type 310C "C", and the schema graph of FIG. 4 has a corresponding directed edge labeled "ref_C" that originates at a node labeled with object type 310A "A" and points to a node labeled with object type 310C "C".

Figure 5:
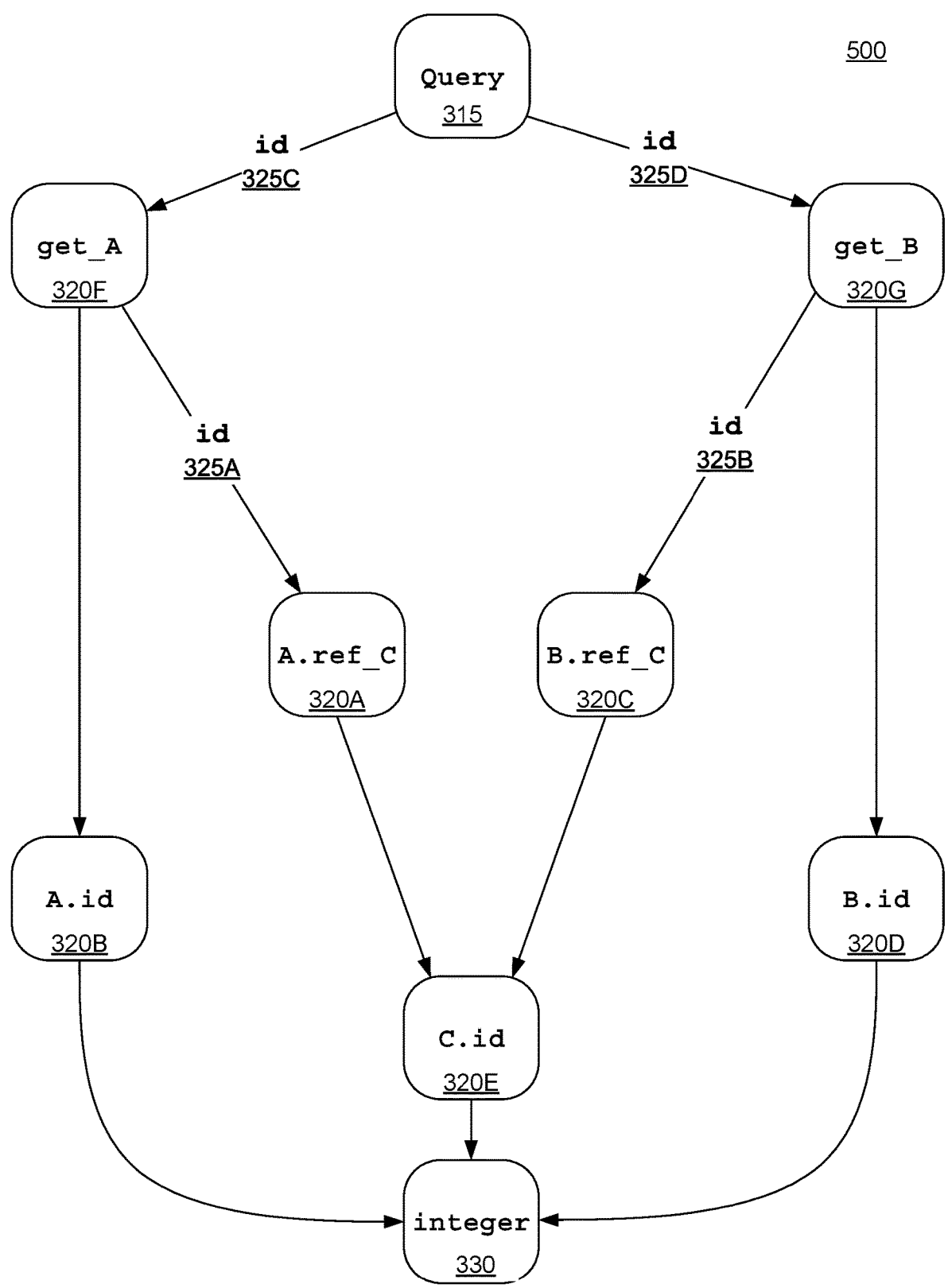
FIG. 5 illustrates an example line graph for the API structure of FIG. 3B, in accordance with an embodiment.

FIG. 5 illustrates an example line graph for the API structure of FIG. 3B, in accordance with an embodiment. The line graph generator 220 generates a line graph such as a line graph 500 based on a schema graph, e.g., the schema graph 400. The line graph 500 includes root type object 315 nodes and scalar type object 330 nodes from the schema graph 400. The line graph 500 additionally includes nodes that are labeled with fields 320 that were previously represented by directed edges in the schema graph 400. In one embodiment, the line graph generator 220 uses the schema graph 400 to create the line graph 500 by replacing the directed edges that represent fields 320 in the schema graph 400 with nodes that represent the fields 320. For example, where the schema graph 400 in FIG. 4 includes a directed edge labeled "get_A" representing a field 320F of the "Query" root object type 315, the line graph 500 includes a node labeled "get_A" representing the field 320F.

Directed edges of the line graph 500 represent resolution logic of the API structure 300. Directed edges of the line graph 500 represent the inputs to the fields 320. In one embodiment, a directed edge that leads to a node representing a field 320 is labeled with any input arguments 325 that are accepted by the field 320. Thus, directed edges that lead to nodes representing fields 320 that do not accept input arguments 325 may not be labeled.

Per the descriptions of the line graph 500 generation above, the example line graph 500 of FIG. 5 includes representative nodes and edges. Specifically, the line graph 500 includes a node labeled "Query" representing a root type object 315, and a node labeled "integer" representing a scalar type object 330. The line graph 500 additionally includes nodes representing fields 320. The nodes include nodes labeled "get_A", "get_B", "A.ref_C", "B.ref_C", "A.id", "B.id", and "C.id" which correspond to fields 320F, 320G, 320A, 320C, 320B, 320D, and 320C, respectively. The directed edges connecting the nodes of the line graph 500 follow the same logical path as the directed edges of the schema graph 400. Four fields 320 of the API schema 300 include arguments 325. Accordingly, four of the directed edges in the line graph 500 are labeled, i.e., with the arguments 325 accepted as inputs by the fields 320 represented by the frontier nodes to which the labeled edges are directed. That is, the node "get_A" representing field 320F of root object type 315 accepts an argument 325C and the associated directed edge is labeled with the argument name "id". The node "get_B" representing field 320G of root object type 315 accepts an argument 325D and the associated directed edge is labeled with the argument name "id". The node "A.ref_C" representing field 320A of object type 310A "A" accepts an argument 325A and the associated directed edge is labeled with the argument name "id". The node "B.ref_C" representing field 320C of object type 310B "B" accepts an argument 325B and the associated directed edge is labeled with the argument name "id".

Figure 6:
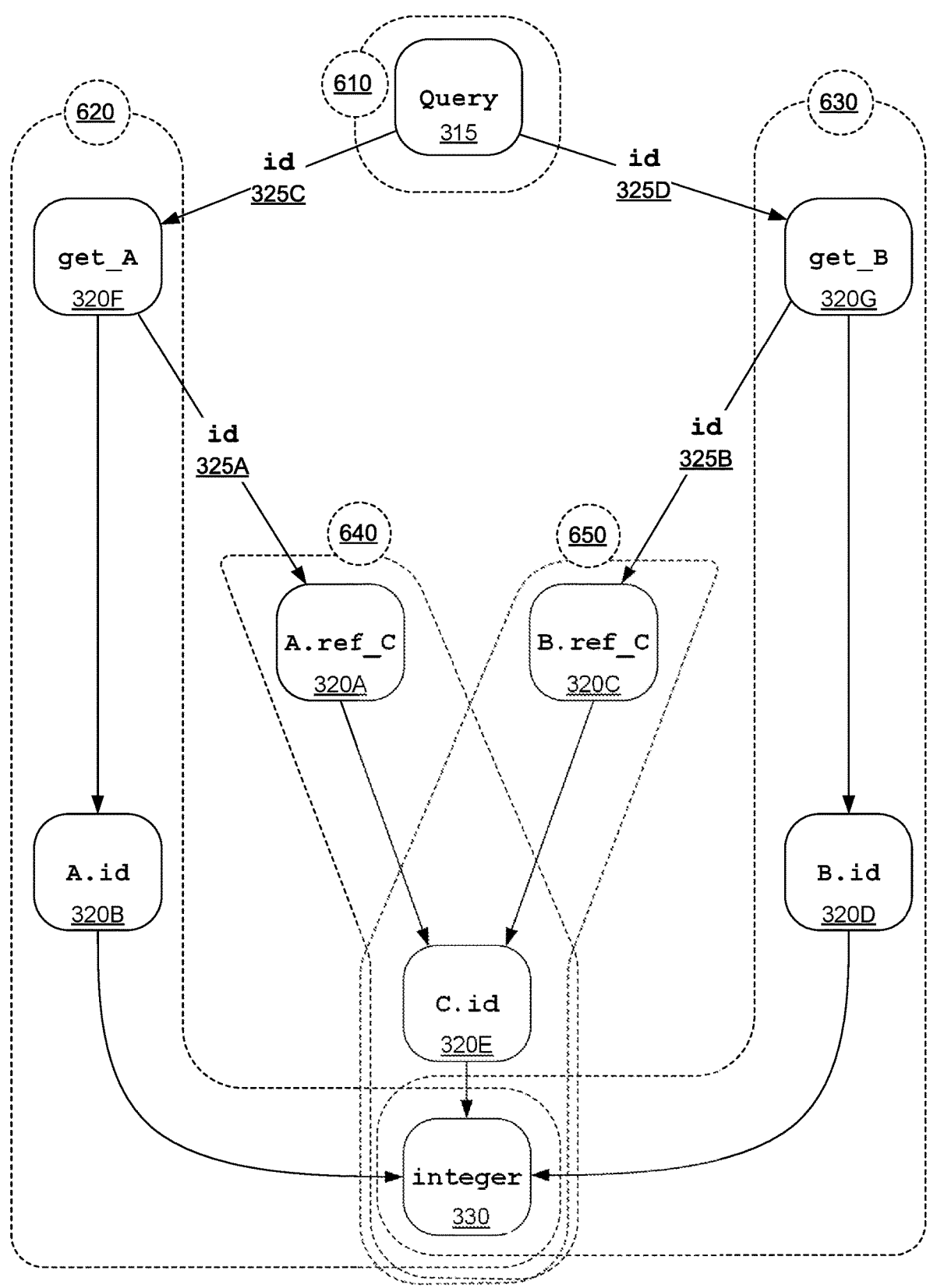
FIG. 6 illustrates an example of generated frontiers in accordance with an embodiment.

FIG. 6 illustrates an example of generated frontiers in accordance with an embodiment. As described previously, a frontier is a subgraph of the line graph such that: (1) the subgraph is rooted at either a frontier node of the line graph (i.e., a node representing a field of the API that accepts input arguments) or at a root node of the line graph (e.g., the "Query" node), and (2) the subgraph is the maximal subgraph disjoint from other frontier nodes. Frontiers may have the same nodes as other frontiers, but frontiers do not share frontier nodes. In one embodiment, the frontier computation module 230 determines frontiers by grouping nodes of the line graph 500 that can be reached via the directed edges of the line graph from a frontier node or a root node without traversing a directed edge labeled with a field argument 325. The example of FIG. 6 illustrates five frontiers, 610, 620, 630, 640 and 650. The frontiers are indicated by dotted lines that divide the line graph 500 into subgraphs. Each frontier is rooted at a frontier node that accepts a directed edge labeled with an input argument 325. For example, frontier 610 includes the root type object 315 node labeled "Query" which is separated from other nodes in the line graph by directed edges that are labeled with arguments 325C and 325D. The frontier 620 includes a frontier node "get_A" representing field 320F and nodes "A.id" representing field 320B, and "integer" representing a scalar object 330. The frontier 630 includes frontier node "get_B" representing field 320G and nodes "B.id" representing field 320D, and "integer" representing a scalar object 330. The frontier 640 is rooted at frontier node "A.ref_C" representing field 320A, and further includes nodes "C.id" representing field 320E, and "integer" representing a scalar object 330. The frontier 650 is rooted at frontier node "B.ref_C" representing field 320C, and further includes nodes "C.id" representing field 320E and "integer" representing a scalar object 330.

Figure 7:
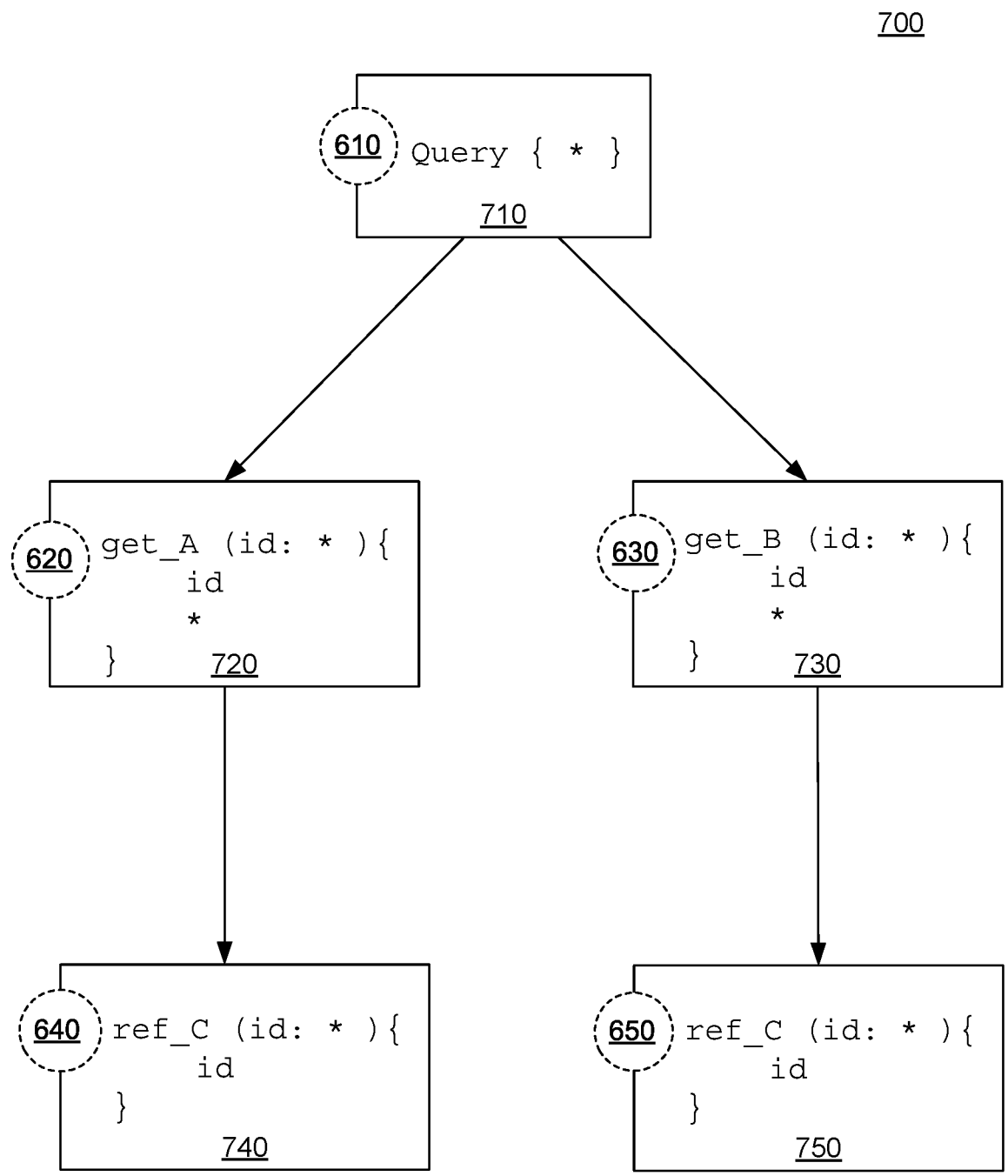
FIG. 7 illustrates example representative documentation that is generated for auditing a set of frontiers, in accordance with an embodiment.

FIG. 7 illustrates example representative documentation that is generated for auditing a set of frontiers, in accordance with an embodiment. The graph structure shown in FIG. 7 may be referred to herein as a document graph 700. The frontier testing module 240 generates the representative documentation for use in auditing an API based on the frontiers generated by the frontier computation module 230. The document graph 700 is represented by the directed edges of FIG. 7 that connect boxes representing representative documents 710, 720, 730, 740, and 750, which are associated respectively with frontiers 610, 620, 630, 640, and 650. The directed edges of the document graph 700 correspond to the directed edges of the line graph 500 that are labeled with arguments 325 and thus represent logical points of entry into the frontiers for testing. In the example of FIG. 7, asterisks within the representative documentation for the various frontiers indicate places where various testing input values may be provided during auditing. In one embodiment, a document graph 700 provides a representation of dependencies among representative documents. For example, in FIG. 7, a set of input values used for testing frontier 610 may include as an input value the content of the representative document for frontier 730 and may include as another input value the content of the representative document for frontier 720.

To determine a representative set of queries for auditing the API, the frontier testing module 240 determines a set of paths through the document graph 700 that accesses each of the frontiers (i.e., that will touch each of the nodes of the document graph 700). Since a frontier is accessed using the same input arguments regardless of which path along the document graph 700 is used to access it, auditing the API does not require traversal of all paths in the document graph 700. Thus, to more efficiently audit the API, the frontier testing module 240 may determine the shortest set of paths through the document graph 700, for the sake of determining an order in which representative documents that may be dependent on other representative documents should be tested.

A set of shortest paths that traverse the document graph 700 may be determined using weighting factors. In various embodiments, the weighting of edges in the document graph 700 may be based on different metrics. In one embodiment, a weight value assigned to an edge of the document graph 700 represents a number of input arguments that are associated with the edge. For example, with reference to FIG. 6, the directed edge connecting frontier 610 to frontier 620 is labeled in one argument 325C. However, in some cases, and edge of the line graph 500 may be labeled with multiple arguments (e.g., when a field 320 accepts multiple arguments 325) and the number of arguments may be used by the frontier testing module 240 as a weight value for the edge. In some cases, a field 320 may also have multiple arguments 325 wherein some of the arguments 325 are required for the field to resolve and other arguments are optional (e.g., because they have a default value). In one embodiment, the weight of an edge of the document graph 700 may be related to a number of input arguments 325 that are associated with the edge and that are required for the field 320 to resolve, and is also related to a number of the input arguments 325 that are associated with the edge that are optional.

In one embodiment, a weight value assigned to an edge of the document graph 700 may be associated with whether non-deterministic transitions are required to resolve the field 320 of the API structure that is associated with the frontier. For example, if a field 320 sometimes resolves to one object type 310 and other times resolves to another object type 310, auditing the document graph 700 via the associated directed edge may be complicated by the multiple possible resolutions that may occur for different test inputs. Thus, edges associated with non-deterministic transitions may be assigned larger weight values for the sake of calculating a set of shortest paths to traverse the document graph 700.

In one embodiment, a weight value assigned to an edge of the document graph 700 may be related to the complexity of the one or more arguments 325 that are associated with the edge. That is, a simpler argument 325 may require fewer resources to audit and thus the associated edge may receive a lower weighting value than an edge associated with a more complex argument 325 for the purposes of determining a set of shortest paths to traverse the document graph 700. For example, an argument may itself be another object made up of multiple fields. Although it is one argument, it includes multiple pieces of data and so is more complex than an argument that is an object with one or two fields or a scalar argument.

Using weighting metrics associated with the document graph 700, the frontier testing module 240 may use a shortest path algorithm to determine a traversal of the frontiers of the document graph 700. The determined set of shortest paths identify an order in which representative documents or queries for each of the frontiers will be tested during an audit. A representative document may include a set of API function calls or other API requests or queries that accept input arguments. In the example of FIG. 7, locations where input values may be provided to test the frontiers are identified with asterisks.

Any approaches for generating a representative document may be extended with a binary classification model where, for each frontier path, the frontier testing module 240 may classify the path as either viable or non-viable, using a classification algorithm such as regularized linear models with Stochastic Gradient Descent (SGD) or Linear Support Vector Clustering (SVC) based on training data. The specifics of the algorithm may depend on an amount of available training data (e.g., SVC may be preferred for small datasets). In some embodiments, the training may be semi-supervised, making use of an oracle (i.e., a mechanism or system configured to determine whether a test has passed or failed) to provide active learning capabilities.

The input to a model may be the schema of the input arguments to the representative documents generated according to a given frontier path, including the types and constraints of each input argument along the path. The output of the model may be a classification indicating whether the path is viable or is not viable. In a training scenario, the oracle is whether or not a valid response was received for a document generated for a given frontier. A response may be valid if it contains a valid output for the frontier that is being tested or queried.

Once classified, the set of possible frontier paths may be pruned to include only those frontier paths that are identified as viable. The viable paths may be ordered by a distance metric, such as shortest path, or by some other non-deterministic metric.

In another embodiment, an additional distance metric may not be needed. The model may be configured to accept the schema of the input arguments to the representative documents generated according to a given frontier path, including the types and constraints of each input argument along the path. The model may be configured to output a confidence value that is representative of a likelihood that a given frontier path is viable. This model may use similar algorithms as the previously described model and may be supervised in a similar way for training. In this example embodiment, the output may be a real number representing a confidence in the viability of a frontier path. As a result, the paths may be ranked by confidence value as a way to prioritize the use of certain frontier paths over others.

In another embodiment, a model may be trained using supervised learning with a labeled sample dataset for which frontier paths are valid. This embodiment of using machine learning to determine viable frontier paths has a simplified training process, but reduces the versatility of the algorithms, as it may require data to be relabeled and for the model to be retrained whenever other aspects of the audit system 130 are improved or modified.

Figure 8:
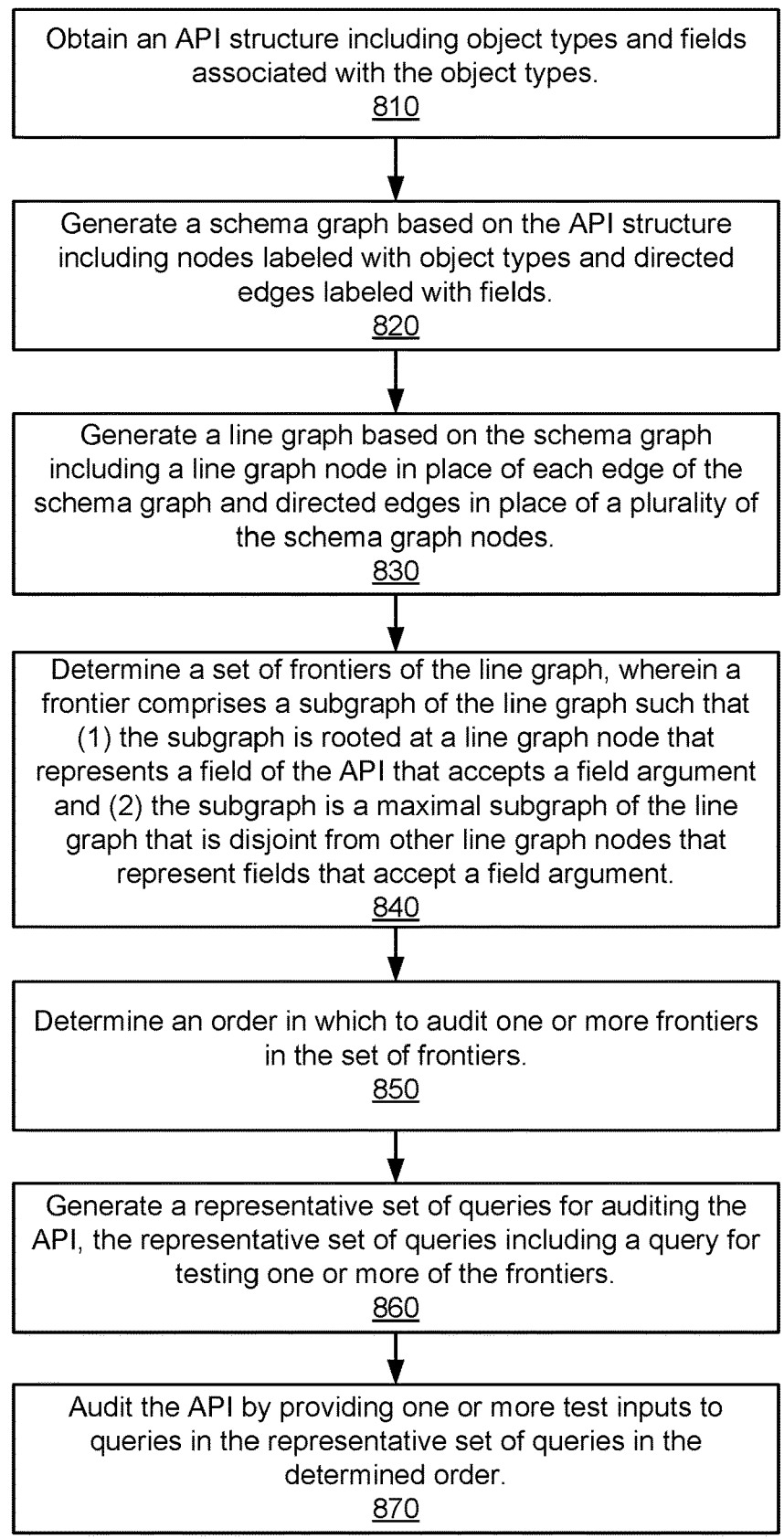
FIG. 8 is a flowchart illustrating a method of efficiently auditing an API, in accordance with an example embodiment.

FIG. 8 is a flowchart illustrating a method of efficiently auditing an API, in accordance with an example embodiment. At 810, the audit system 130 obtains an API structure 300 including object types 310 and fields 320 associated with the object types. In one embodiment, each field 320 has a field name 323 and a field resolution type 327.

At 820, the schema graph generator 210 generates a schema graph 400 based on the API structure 300. The schema graph 400 includes nodes labeled with the object types 310 specified in the API structure 300. The schema graph 400 also includes, for each of the fields 320 associated with an object type 310, a directed edge that may be labeled with the field name 323 of the field 320 that connects the node labeled with the object type 310 to a node labeled with the object type 310 identified by the field resolution type 327 of the field 320.

At 830, the line graph generator 220 generates a line graph 500 based on the schema graph 400. The line graph 500 includes nodes labeled with field names 323 and directed edges labeled with input arguments 325 that represent inputs to the named fields 320. Specifically, the line graph generator 220 may generate a line graph 500 by converting the edges of a schema graph 400 into nodes labeled with a field name 323 and representing a field 320 in place of each edge of the schema graph 400 that represents a field 320. Directed edges of the line graph 500 may include labels that represent the one or more input arguments for fields 320 of the structure that accept at least one input argument 325 and are labeled with the one or more accepted input arguments 325.

At 840, the frontier computation module 230 determines a set of frontiers of the line graph 500. A frontier may be a subgraph of the line graph 500 such that (1) the subgraph is rooted at a line graph node that represents a field of the API that accepts a field argument 325 and (2) the subgraph is a maximal subgraph of the line graph that is disjoint from other line graph nodes that represent fields 320 that accept a field argument 325.

At 850, the frontier testing module 240 determines an order in which to audit the frontiers in the set of frontiers. At 860, the frontier testing module 240 generates a representative set of queries for auditing the API that may include a query for testing one or more of the determined frontiers. At 870, in one embodiment, an API auditor 250 may audit the API by providing one or more test inputs to the queries in the representative set of queries in the determined order. In some embodiments, an audit process may involve providing one or more test input values for each of the representative queries and determining whether returned or resulting values are the expected values (e.g., as identified as output types by an introspection result or other API documentation).

Figure 9:
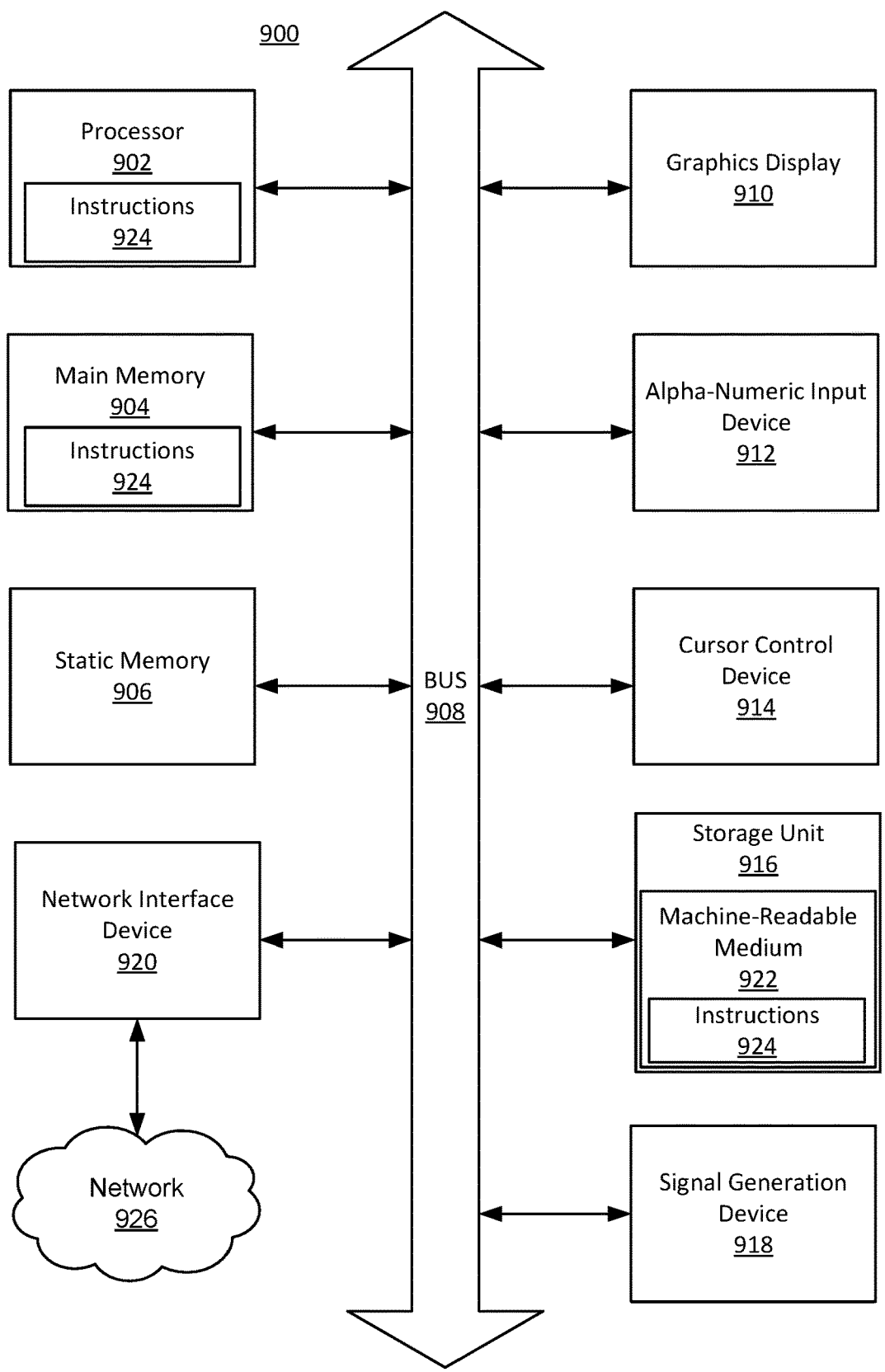
FIG. 9 is a block diagram illustrating components of an example machine able to read instructions from a machine-readable medium and execute them in one or more processors (or controllers).

FIG. 9 is a block diagram illustrating components of an example machine able to read instructions from a machine-readable medium and execute them in one or more processors (or controllers). Specifically, FIG. 9 shows a diagrammatic representation of the audit system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include instructions for implementing the functionalities of the schema graph generator 210, the line graph generator 220, the frontier computation module 230, the frontier testing module 240, and/or the API auditor 250. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926, such as the network 120, via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may include a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   obtaining a structure of an application programming interface (API) describing object types defined by the API and fields associated with the object types, the fields having field names and field resolution types;
   generating a schema graph, the schema graph including:
      a plurality of schema graph nodes, each schema graph node labeled with an object type defined by the structure of the API, and for each field associated with an object type in the structure of the API, a directed edge originating at a first schema graph node that represents the object type associated with the field and leading to a second schema graph node that represents an object type identified by the field resolution type of the field;

generating a line graph, the line graph including a line graph node labeled with one of the field names in place of each directed edge of the schema graph and the line graph also including directed edges in place of the schema graph nodes of the schema graph;

determining a set of frontiers of the generated line graph, wherein each frontier in the set of frontiers comprises a subgraph of the line graph such that (1) the subgraph is rooted at a line graph node that represents one of the fields of the API that accepts at least one field argument and (2) the subgraph is a maximal subgraph of the line graph that is disjoint from other line graph nodes that represent fields that accept at least one field argument;

generating a document graph having a set of queries that each correspond to one of the frontiers in the set of frontiers, wherein the set of queries tests the set of frontiers thereby auditing the API, and wherein at least one query in the set of queries is dependent on an execution of another query in the set of queries;

determining a shortest ordered set of paths in the document graph to access all of the queries in the set of queries; and executing, by a processor, the queries in the set of queries in an order specified by the shortest ordered set of paths, thereby auditing the API for a security vulnerability.

2. The computer-implemented method of claim 1, wherein the schema graph begins at a node representing a root object type that is identified by the structure as an entry point for the API.

3. The computer-implemented method of claim 1, wherein the directed edges of the schema graph ultimately resolve to one or more line graph nodes labeled with scalar object types, and wherein a scalar object type is an object having no fields.

4. The computer-implemented method of claim 1, wherein the document graph includes document graph nodes representative of the frontiers in the set of frontiers and the document graph also includes directed edges connecting the document graph nodes of the document graph, wherein the directed edges of the document graph are the directed edges of the line graph that accept one or more input arguments.

5. The computer-implemented method of claim 4, wherein determining the shortest ordered set of paths further comprises determining a shortest path through the document graph that accesses each of the frontiers in the set of frontiers.

6. The computer-implemented method of claim 5, wherein the directed edges of the document graph are weighted for purposes of determining the shortest path, and a weight of one of the directed edges of the document graph represents a number of input arguments that are associated with the directed edge of the document graph.

7. The computer-implemented method of claim 5, wherein the directed edges of the document graph are weighted for purposes of determining the shortest path, and a weight of one of the directed edges of the document graph is associated with whether non-deterministic transitions are required to resolve the fields that are associated with each of the frontiers represented in the document graph.

8. The computer-implemented method of claim 5, wherein the directed edges of the document graph are weighted for purposes of determining the shortest path, and a weight of one of the directed edges of the document graph is related to a first number of the input arguments that are associated with the directed edge of the document graph that are required and a second number of the input arguments that are associated with the directed edge of the document graph that are optional.

9. A non-transitory computer-readable storage medium comprising instructions that, when executed by a processor, cause the processor to perform steps of:

obtaining a structure of an application programming interface (API) describing object types defined by the API and fields associated with the object types, the fields having field names and field resolution types;

generating a schema graph, the schema graph including:
a plurality of schema graph nodes, each schema graph node labeled with an object type defined by the structure of the API, and
for each field associated with an object type in the structure of the API, a directed edge originating at a first schema graph node that represents the object type associated with the field and leading to a second schema graph node that represents an object type identified by the field resolution type of the field;

generating a line graph, the line graph including a line graph node labeled one of the field names in place of each directed edge of the schema graph and the line graph also including directed edges in place of the schema graph nodes of the schema graph;

determining a set of frontiers of the generated line graph, wherein each frontier in the set of frontiers comprises a subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument;

generating a document graph having a set of queries that each correspond to one of the frontiers in the set of frontiers, wherein the set of queries tests the set of frontiers thereby auditing the API, and wherein at least one query in the set of queries is dependent on an execution of another query in the set of queries;

determining a shortest ordered set of paths in the document graph to access all of the queries in the set of queries; and executing the queries in the set of queries in an order specified by the shortest ordered set of paths, thereby auditing the API for a security vulnerability.

10. The non-transitory computer-readable storage medium of claim 9, wherein the schema graph begins at a node representing a root object type that is identified by the structure as an entry point for the API.

11. The non-transitory computer-readable storage medium of claim 9, wherein the directed edges of the schema graph ultimately resolve to one or more line graph nodes labeled with scalar object types, and wherein a scalar object type is an object having no fields.

12. The non-transitory computer-readable storage medium of claim 9, wherein the document graph includes document graph nodes representative of the frontiers in the set of frontiers and the document graph also includes directed edges connecting the document graph nodes of the document graph, wherein the directed edges of the document graph are the directed edges of the line graph that accept at least one or more input arguments.

13. The non-transitory computer-readable storage medium of claim 12, wherein determining the shortest ordered set of paths further comprises determining a shortest path through the document graph that accesses each of the frontiers in the set of frontiers.

14. The non-transitory computer-readable storage medium of claim 13, wherein the directed edges of the document graph are weighted for purposes of determining the shortest path, and a weight of one of the directed edges of the document graph represents a number of input arguments that are associated with the directed edge of the document graph.

15. The non-transitory computer-readable storage medium of claim 13, wherein the directed edges of the document graph are weighted for purposes of determining the shortest path, and a weight of one of the directed edges of the document graph is associated with whether non-deterministic transitions are required to resolve the fields that are associated with each of the frontiers represented in the document graph.

16. The non-transitory computer-readable storage medium of claim 13, wherein the directed edges of the document graph are weighted for purposes of determining the shortest path, and a weight of one of the directed edges of the document graph is related to a first number of the input arguments that are associated with the directed edge of the document graph that are required and a second number of the input arguments that are associated with the directed edge of the document graph that are optional.

17. A system comprising:
a processor; and
a non-transitory computer-readable storage medium comprising instructions that, when executed by the processor, cause the processor to perform steps of:
obtaining a structure of an application programming interface (API) describing object types defined by the API and fields associated with the object types, the fields having field names and field resolution types;
generating a schema graph, the schema graph including:
a plurality of schema graph nodes, each schema graph node labeled with an object type defined by the structure of the API, and
for each field associated with an object type in the structure of the API, a directed edge originating at a first schema graph node that represents the object type associated with the field and leading to a second schema graph node that represents an object type identified by the field resolution type of the field;
generating a line graph, the line graph including a line graph node labeled with one of the field names in place of each directed edge of the schema graph and the line graph also including directed edges in place of the schema graph nodes of the schema graph;
determining a set of frontiers of the generated line graph, wherein each frontier in the set of frontiers comprises a subgraph of the line graph such that (1) the subgraph is rooted at a line graph node that represents a field of the API that accepts at least one field argument and (2) the subgraph is a maximal subgraph of the line graph that is disjoint from other line graph nodes that represent fields that accept at least one field argument;
generating a document graph having a set of queries that each correspond to one of the frontiers in the set of frontiers, wherein the set of queries tests the set of frontiers thereby auditing the API, and wherein at least one query in the set of queries is dependent on an execution of another query in the set of queries;
determining a shortest ordered set of paths in the document graph to access all of the queries in the set of queries; and
executing the queries in the set of queries in an order specified by the shortest ordered set of paths, thereby auditing the API for a security vulnerability.

18. The system of claim 17, wherein the document graph includes document graph nodes representative of the frontiers in the set of frontiers and the document graph also includes directed edges connecting the document graph nodes of the document graph, wherein the directed edges of the document graph are the directed edges of the line graph that accept at least one input argument.

* * * * *